Patented Dec. 23, 1952

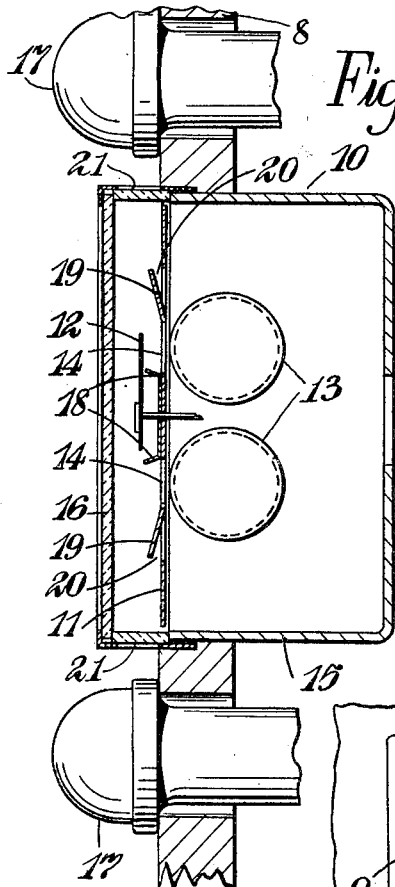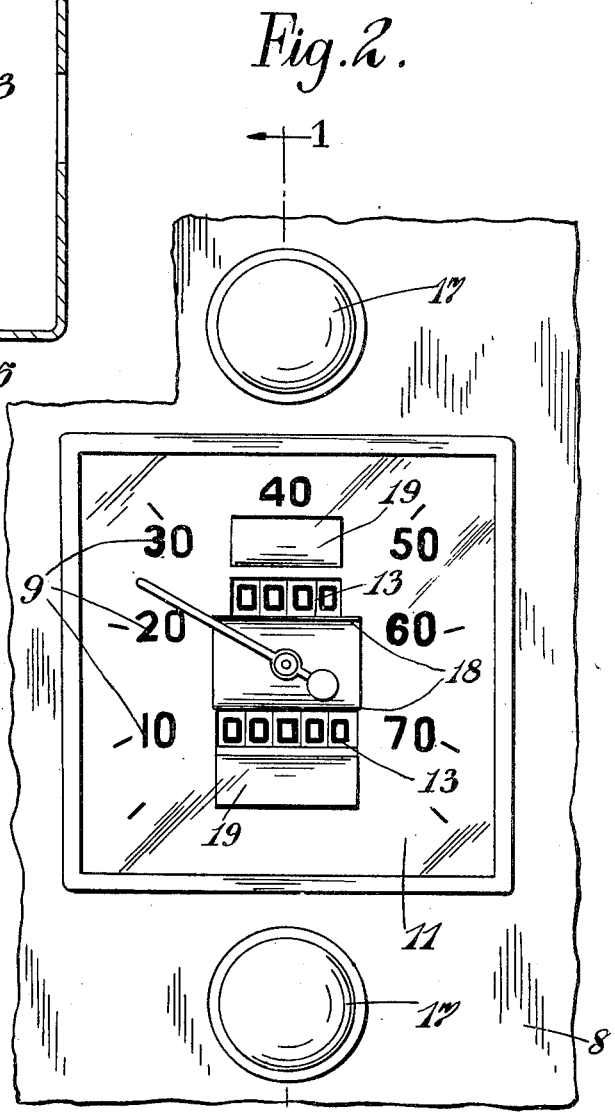

2,623,182

UNITED STATES PATENT OFFICE 2,623,182

INSTRUMENT OR DISPLAY DEVICE HAVING MARKINGS RENDERED FLUORESCENT BY INVISIBLE LIGHT RAYS

Victor James Samuel Russell, Cricklewood, London, England, assignor to S. Smith & Sons (England) Limited, London, England, a British company Application June 9, 1949, Serial No. 98,044
In Great Britain July 9, 1948

10 Claims. (Cl. 250—72)

This invention relates to instruments or display devices having markings which may be rendered fluorescent by suitable light rays outside or nearly outside the visible spectrum, such as ultra-violet or infra-red rays. The more usual way of illuminating markings on instruments is by the reflection therefrom of the light of invisible wavelength. Such illumination, however, suffers from the disadvantage that the light which does not actually strike the markings is reflected and scattered by other parts of the instruments and results in a general level of illumination which is undesirable, and also in reducing the contrast between the markings and their surroundings.

In order to avoid these objections, it has been proposed to illuminate the whole of the instrument face or dial with ultra-violet rays and coat the markings along with a substance which is fluorescent in ultra-violet rays. However, when the source of ultra-violet rays requires to be located comparatively close to the plane in which the markings are situated, and to one side of the markings, as for instance in the case of a dashboard instrument for a vehicle, there is difficulty in ensuring that sufficient radiation reaches all the markings, particularly if any of the markings are sunk below the general level of the dial-plate of the instrument which is the case when the markings are on a drum viewable through a window in the dial-plate. It is the object of the present invention to provide means for overcoming the above difficulty.

According to this invention, an instrument or display device having markings which are arranged to be rendered fluorescent by a source of invisible light radiation disposed in front of and/or to one side of the markings, is characterised in the provision of one or more reflectors so located in the neighbourhood of the markings as to direct the invisible rays on to them without their being obscured to view by the reflectors.

In the case where said markings are on a moving part arranged behind a dial-plate having a window through which the markings may be viewed as they move successively in front of the window, the aforesaid reflector or reflectors may be mounted at or near that edge of the window which is remote from the source of invisible light rays; for example, the reflector may be formed by bending or pressing outwardly a part of the plate which may be formed from metal and polished to provide the necessary reflecting surface.

The plate may also be formed with a slot on that side of the window adjacent the source of invisible light rays, so that the rays may pass through the slot directly on to the markings viewable through the window.

The aforesaid slot may be arranged adjacent to the window and may be obscured to direct view by a shroud so that the markings are not viewable through the slot. Again, in this instance, the shroud may be formed by suitably slitting the plate and bending a portion outwardly whereby both a slot and a shroud are provided.

The following is a description of the invention as applied to the illumination of a speedometer dial for use in an instrument panel of a vehicle, reference being made to the accompanying drawing in which:

Figure 1 is a diagrammatic sectional elevation; and

Figure 2 is a front view of the arrangement shown in Figure 1.

The speedometer 10 may be of conventional form, in which the dial-plate 11 is marked with graduations 9 near its outer periphery representing miles per hour, and over which a pointer 12 moves, thereby indicating the speed of the vehicle. The instrument is also provided with mileage recorders in the form of drums 13 arranged with their axes horizontal and parallel with the dial-plate which is provided with a window 14 opposite each set of drums, so that the figures are viewable. The assemblage being arranged within a casing 15 having a cover plate 16. It will be appreciated, therefore, that the figures on the drums are necessarily recessed back from the front face of the dial-plate 11. Both the graduations on the dial-plate 11 and the figures on the mileage recorder drums 13 are coated with a composition which is rendered fluorescent by ultra-violet rays. The two sets of drums may be arranged one above the other, and two ultra-violet lamps 17 are mounted on the instrument board 2 one above and the other below the instrument. Owing to the limitation of space for mounting the instruments, the ulra-violet lamps can usually only be mounted slightly in front of the plane of the dial-plate 11. In order to ensure adequate irradiation of the figures on each set of mileage recorder drums, a reflector is formed along the lower edge of the upper window and the upper edge of the lower window. This may be effected by slitting the material of the dial-plate and bending it outwardly at 18 at such an angle as to reflect the ultra-violet rays from the adjacent lamp rearwardly through the window. For this purpose, the dial-plate may be formed from metal which may be polished on the back face, at least along those parts constituting the reflectors 18, while the front face is preferably non-reflecting.

In order still further to increase the illumination of the figures on the mileage recorder drums, the material of the dial-plate 11 is so slit between the upper window 14 and the adjacent lamp 17 and between the lower window 14 and its adjacent lamp 17, that flaps 19 may be bent outwardly adjacent each window at a comparatively small angle so as to obscure to view the slots 20 formed beneath them, but permitting the ultra-violet rays from the adjacent lamps to pass through windows 21 in the casing 15 and through the slots 20 on to the drum. For this purpose, the upper flap is joined to the dial-plate along its lower edge, whereas the lower flap is joined to the dial-plate along its upper edge.

It will be appreciated that if necessary or more convenient, the flaps and the reflectors may be formed separately and secured to the dial-plate.

I claim:

1. A display device comprising a moving part bearing markings adapted to be rendered fluorescent by a source of invisible light rays disposed to one side of said markings, a mask having a window arranged opposite said moving part and a reflector mounted along one side of the window remote from said source and to one side of the direct line between the source and the markings so as to direct on to the markings, viewable through the window, those rays which would otherwise pass clear of them.

2. A display device comprising a moving part bearing markings adapted to be rendered fluorescent by a source of invisible light rays disposed to one side of said markings, a sheet metal mask having a window arranged opposite said moving part which sheet metal part is so shaped along one side of the window as to form a reflector remote from said source and to one side of the direct line between the source and the markings so as to direct on to the markings, viewable through the window, those rays which would otherwise pass clear of them.

3. A display device comprising a moving part bearing markings adapted to be rendered fluorescent by a source of light rays disposed to one side of said markings, a mask having a window arranged opposite said moving part, a reflector along one side of the window arranged opposite said moving part, a reflector along one side of the window remote from said source and to one side of the direct line between the source and the markings so as to direct on to the markings viewable through the window those rays which would otherwise pass clear of them, and which mask is provided with a slot on that side of the window adjacent the aforesaid source so that the rays may pass through the slot directly on to the mask viewable through the window.

4. A display device comprising a moving part bearing markings adapted to be rendered fluorescent by a source of light rays disposed to one side of said markings, a mask having a window arranged opposite said moving part, a reflector along one side of the window remote from said source and to one side of the direct line between the source and the markings, viewable through the window so as to direct on to the markings those rays which would otherwise mask the others, and which mask is provided with a slot on that side of the window adjacent the aforesaid source so that the rays may pass through the slot directly on to the mask viewable through the window, and a shroud arranged over the mask so that the markings are not directly viewed through the slot.

5. A display device comprising a moving part bearing markings adapted to be rendered fluorescent by a source of invisible light rays disposed to one side of said markings, a mask having a window arranged opposite said moving part, which mask is so shaped as to provide a reflector along that side of the window remote from said source and to one side of the direct line between the source and the markings so as to direct on to the markings, viewable through the window those rays which would otherwise pass clear of them, and which mask is slit and bent adjacent the opposite side of the window so as to provide a slot through which the rays may pass direct to the aforesaid markings.

6. A milometer comprising a milometer drum bearing markings adapted to be rendered fluorescent by a source of invisible light rays disposed to one side thereof, a mask in front of said drum having a window through which said markings can be traversed, a reflector along one side of said window and to one side of the direct line between the source and said markings so as to direct on to the markings those rays which would otherwise pass clear of them.

7. A milometer comprising a milometer drum bearing markings adapted to be rendered fluorescent by a source of invisible light rays disposed to one side thereof, a mask in front of said drum having a window through which said markings can be traversed, a reflector along one side of said window and to one side of the direct line between the source and the markings so as to direct on to the markings those rays which would otherwise pass clear of them, and which mask is provided with a slot near the opposite side of the window through which said light rays may pass direct to said markings.

8. A combined milometer and speedometer comprising a milometer drum having markings adapted to be rendered fluorescent by a source of invisible light rays disposed to one side thereof, a mask arranged in front of said drum, having a window through which said markings are visible, a speedometer scale on the front of this mask, a reflector on said mask arranged along one side of the window and to one side of the direct line between the source and the markings so as to direct on to the markings those rays which would otherwise pass clear of them.

9. A combined milometer and speedometer comprising two sets of milometer drums arranged one above the other and rotatable about parallel axes, a mask arranged in front of the drums and provided with a window opposite the markings on each set of drums, a reflector along the lower edge of the upper window and along the upper edge of the lower window, a casing containing the said drums and masks, windows in the upper and lower edges of said casing, a source of invisible light rays opposite each window which reflectors are arranged to one side of the direct line between each light source and in the markings so as to direct on to the markings those rays which would otherwise pass clear of them.

10. A combined milometer and speedometer comprising two sets of milometer drums arranged one above the other and rotatable about parallel axes, a mask arranged in front of the drum and provided with a window opposite the markings on each set of drums, a reflector along the lower edge of the upper window and along the upper edge of the lower window, a casing containing the said drums and masks, windows in the upper and lower edges of said casing, a source of invisible light rays opposite each window, which mask is provided with slots from the top window and a slot below the lower window, and a shroud disposed opposite to each slot which reflectors are arranged to one side of the direct line between each light source and in the markings so as to direct on to the markings those rays which would otherwise pass clear of them.

VICTOR JAMES SAMUEL RUSSELL.

REFERENCES CITED

The following references are of record in the file of this patent:

UNITED STATES PATENTS

| Number | Name | Date |
|---|---|---|
| 1,474,816 | Day | Nov. 20, 1923 |
| 2,247,409 | Roper | July 1, 1941 |
| 2,310,743 | Moss | Feb. 9, 1943 |
| 2,428,792 | Evans | Oct. 14, 1947 |
| 2,459,694 | Gordon | Jan. 18, 1949 |